US012255889B2

(12) United States Patent
Hecht

(10) Patent No.: US 12,255,889 B2
(45) Date of Patent: *Mar. 18, 2025

(54) DETECTING AND PREVENTING UNAUTHORIZED CREDENTIAL CHANGE

(71) Applicant: CyberArk Software Ltd., Petach-Tikva (IL)

(72) Inventor: Asaf Hecht, Petach-Tikva (IL)

(73) Assignee: CyberArk Software Ltd., Petach-Tikva (IL)

( * ) Notice: Subject to any disclaimer, the term of this patent is extended or adjusted under 35 U.S.C. 154(b) by 467 days.

This patent is subject to a terminal disclaimer.

(21) Appl. No.: 17/535,261

(22) Filed: Nov. 24, 2021

(65) Prior Publication Data

US 2022/0086142 A1 Mar. 17, 2022

Related U.S. Application Data

(63) Continuation-in-part of application No. 15/998,532, filed on Aug. 16, 2018, now Pat. No. 11,210,387.

(51) Int. Cl.
*H04L 9/40* (2022.01)
*G06F 21/45* (2013.01)

(52) U.S. Cl.
CPC ........ *H04L 63/0846* (2013.01); *H04L 63/102* (2013.01); *H04L 63/1416* (2013.01);
(Continued)

(58) Field of Classification Search
None
See application file for complete search history.

(56) References Cited

U.S. PATENT DOCUMENTS 6,993,658 B1 1/2006 Engberg et al.
8,056,123 B2 * 11/2011 Correl ................ G06F 21/31
 713/184

(Continued)

FOREIGN PATENT DOCUMENTS

CN 1338167 A * 2/2002 ............. G06F 21/32
CN 1871810 B * 9/2010 ........... H04L 9/0891

(Continued)

OTHER PUBLICATIONS

Shammi Ishara Hewamadduma (Detection and Prevention of Possible Unauthorized Login Attempts through Stolen Credentials from a Phishing Attack in an Online Banking System); pp. 6; Published on IEEE (Year: 2017).*

(Continued)

*Primary Examiner* — Eleni A Shiferaw
*Assistant Examiner* — Ali H. Cheema
(74) *Attorney, Agent, or Firm* — Finnegan, Henderson, Farabow, Garrett & Dunner, LLP

(57) ABSTRACT

Techniques include securely accessing data associated with at least one identity capable of accessing one or more access-controlled network resources; generating an intermediate value based on the data associated with the at least one identity; generating, based on application of a secret logic algorithm to the intermediate value, a secret data element; making available, the secret data element, to be embedded in an authentication credential associated with the at least one identity; identifying an attempt to change the authentication credential, the attempt including new authentication credential data to replace data in the authentication credential; validating, conditional on a determination whether the new authentication credential data includes the secret data element in a predefined location, the attempt to change the authentication credential; and determining, based on the (Continued)

validating, whether to perform a control action based on the new authentication credential data.

19 Claims, 8 Drawing Sheets

(52) U.S. Cl.
CPC .......... *H04L 63/1483* (2013.01); *H04L 63/20* (2013.01); *G06F 21/45* (2013.01); *G06F 2221/2141* (2013.01); *H04L 63/083* (2013.01); *H04L 63/10* (2013.01); *H04L 63/1425* (2013.01)

(56) References Cited

U.S. PATENT DOCUMENTS

| | | | |
|---|---|---|---|
| 8,769,637 B2 | 7/2014 | Janzen | |
| 8,918,849 B2 | 12/2014 | Talamo et al. | |
| 8,984,602 B1* | 3/2015 | Bailey | G06F 21/35 726/19 |
| 8,990,905 B1* | 3/2015 | Bailey | G06F 21/6218 726/5 |
| 9,088,556 B2* | 7/2015 | Truskovsky | H04L 63/08 |
| 9,264,425 B1* | 2/2016 | Chen | H04L 9/3273 |
| 10,956,560 B1 | 3/2021 | Sanchez | |
| 2006/0036857 A1 | 2/2006 | Hwang | |
| 2006/0230437 A1 | 10/2006 | Boyer et al. | |
| 2007/0006305 A1 | 1/2007 | Florencio et al. | |
| 2007/0204330 A1* | 8/2007 | Townsley | H04L 61/5014 726/4 |
| 2009/0164489 A1 | 6/2009 | Matsuda | G06F 18/21 |
| 2009/0260077 A1* | 10/2009 | Zhu | H04L 63/083 726/19 |
| 2009/0327740 A1* | 12/2009 | Schneider | H04L 9/3226 713/183 |
| 2010/0218254 A1* | 8/2010 | Gray, II | H04L 63/1408 726/23 |
| 2010/0325690 A1* | 12/2010 | Suzuki | H04N 1/00832 358/1.14 |
| 2011/0252243 A1* | 10/2011 | Brouwer | G06F 21/62 713/189 |
| 2012/0297205 A1 | 11/2012 | Yuen et al. | |
| 2014/0032922 A1* | 1/2014 | Spilman | G06F 21/602 713/184 |
| 2014/0136057 A1* | 5/2014 | Dunning | H04L 9/3297 701/49 |
| 2014/0181290 A1* | 6/2014 | Wong | H04L 63/10 709/224 |
| 2014/0325622 A1 | 10/2014 | Luk et al. | |
| 2015/0058977 A1* | 2/2015 | Thompson | H04L 63/1416 726/22 |
| 2015/0254452 A1 | 9/2015 | Kohlenberg et al. | |
| 2016/0085962 A1 | 3/2016 | Sokolov et al. | |
| 2016/0094569 A1* | 3/2016 | Mondiguing | H04L 63/1416 726/24 |
| 2017/0331856 A1* | 11/2017 | Vissamsetty | H04L 63/1416 |
| 2017/0346797 A1 | 11/2017 | Yedidi et al. | |
| 2018/0121636 A1 | 5/2018 | Schiffman et al. | |
| 2018/0144122 A1 | 5/2018 | Dymond et al. | |
| 2018/0247654 A1* | 8/2018 | Bhaya | G06F 40/205 |
| 2018/0337957 A1* | 11/2018 | Chen | H04L 9/3268 |
| 2019/0007387 A1 | 1/2019 | Jin et al. | |
| 2019/0007428 A1* | 1/2019 | Moen | H04L 67/02 |
| 2020/0052899 A1* | 2/2020 | Finlow-Bates | H04L 9/0643 |

FOREIGN PATENT DOCUMENTS

| | | | | |
|---|---|---|---|---|
| JP | 2000187794 A | * | 7/2000 | |
| WO | WO-2004068351 A1 | * | 8/2004 | ............ G06Q 30/06 |
| WO | WO-2017033442 A1 | * | 3/2017 | ............ G06F 21/31 |

OTHER PUBLICATIONS

Alvaro Madero (Password Secured Systems and Negative Authentication); pp. 55; Published on June (Year: 2013).*

Samuel Gibbs, Passwords And Hacking: The Jargon of Hashing, Salting and SHA-2 Explained, Dec. 15, 2016 (6 pages).

Alvaro Madero, Password Secured Systems and Negative Authentication, Jun. 2013 (55 pages).

* cited by examiner

DETECTING AND PREVENTING UNAUTHORIZED CREDENTIAL CHANGE

CROSS-REFERENCE TO RELATED APPLICATIONS

This application is a continuation-in-part of U.S. patent application Ser. No. 15/998,532, filed on Aug. 16, 2018. The aforementioned application is incorporated herein by reference in its entirety.

BACKGROUND

Attackers often try to gain enhanced or full privileges in target computing networks. One of the methods used by attackers is to compromise an account that has permission to reset passwords, credentials, access keys, or other privileged data. By compromising an account with permission to reset such data, attackers are able to reset the passwords, credentials, or access keys of all other privileged accounts available in the network and are thereby perform a number of malicious actions, which can greatly damage the target network.

Further, the same privileged escalation techniques can be abused by an insider, e.g., a user authorized to access a network with some legitimately granted privileges. For example, an insider may be authorized to operate from only one specific privileged account. The insider may use the account to reset the passwords of some or all the other privileged accounts, or to impersonate the other accounts. Thus, through these techniques of misusing and escalating privileges, a malicious insider may perform harmful actions on behalf of other users.

One basic security measure is the ability to reset and change passwords on a regular basis. For example, requiring the regular changing of passwords helps protect against a scenario in which an attacker steals a specific credential, and later tries to use it. In addition, it is more difficult for a potential attacker to guess or brute-force a periodically rotated password than a static password.

Some networks rely on a central policy manager (CPM) to manage and change passwords or credentials. A CPM may change the passwords of network entities based on a credential change policy that defines the password structure and complexity, the desired frequency of the password rotation, and other factors. The CPM may also update and maintain a secure credential vault for storing network passwords and credentials.

However, there is a need for techniques to ensure that passwords and other credentials are only being modified by the CPM and not by a malicious insider. For example, an insider or a potential attacker who either has, or has gained access to, a privileged account may use the account's permissions to reset passwords of other accounts and thereby expand their freedom of movement within the network. Therefore, the attacker may bypass the credential vault's secured password management by directly resetting the target account's passwords. Technological solutions are needed to address these deficiencies and vulnerabilities in existing approaches to password and credential management.

SUMMARY

The disclosed embodiments describe non-transitory computer readable media, systems, and methods for controlling changes to authentication credentials. For example, in an exemplary embodiment, there may be a non-transitory computer readable medium including instructions that, when executed by at least one processor, cause the at least one processor to perform operations for controlling changes to authentication credentials. The operations may comprise securely accessing data associated with at least one identity capable of accessing one or more access-controlled network resources; generating an intermediate value based on the data associated with the at least one identity; generating, based on application of a secret logic algorithm to the intermediate value, a secret data element; making available, the secret data element, to be embedded in an authentication credential associated with the at least one identity; identifying an attempt to change the authentication credential, the attempt including new authentication credential data to replace data in the authentication credential; validating, conditional on a determination whether the new authentication credential data includes the secret data element in a predefined location, the attempt to change the authentication credential; and determining, based on the validating, whether to perform a control action based on the new authentication credential data.

According to a disclosed embodiment, the data associated with the at least one identity may include at least one of: identity representation information, group relationship information, historical identity data, identity access information, or identity origin information.

According to a disclosed embodiment, the group relationship information may include at least one unique identifier for a group associated with the at least one identity.

According to a disclosed embodiment, the representation of the at least one identity may include an image.

According to a disclosed embodiment, the data associated with the at least one identity may include at least one of: a unique identifier of the at least one identity, a name of the at least one identity, a unique identifier of a group associated with the at least one identity, a creation date, a historical access log, a permission assigned to the at least one identity, a network address associated with the at least one identity, properties of an activity performed by the at least one identity, or an image associated with the at least one identity.

According to a disclosed embodiment, the data associated with the at least one identity may include a combination of two or more categories of data.

According to a disclosed embodiment, generating the secret data element may include performing one or more hashing functions to the data associated with the at least one identity.

According to a disclosed embodiment, performing the one or more hashing functions may include concatenating two or more data elements of the data associated with the at least one identity.

According to a disclosed embodiment, performing the hashing functions may include applying a summation function to the data associated with the at least one identity.

According to a disclosed embodiment, the control action may include rejecting the new authentication credential data.

According to a disclosed embodiment, the control action may include generating an alert identifying the new authentication credential data as a candidate to include a security risk.

According to a disclosed embodiment, the secret data element may be made available together with a randomized data portion.

According to another disclosed embodiment, a method may be implemented for controlling changes to authentication credentials. The method may comprise securely accessing data associated with at least one identity capable of accessing one or more access-controlled network resources; generating an intermediate value based on the data associated with the at least one identity; generating, based on application of a secret logic algorithm to the intermediate value, a secret data element; making available, the secret data element, to be embedded in an authentication credential associated with the at least one identity; identifying an attempt to change the authentication credential, the attempt including new authentication credential data to replace data in the authentication credential; validating, conditional on a determination whether the new authentication credential data includes the secret data element in a predefined location, the attempt to change the authentication credential; and determining, based on the validating, whether to perform a control action based on the new authentication credential data According to a disclosed embodiment, the method may be performed by an agent on the one or more access-controlled network resources.

According to a disclosed embodiment, the method may be performed by an agent on the one or more access-controlled network resources.

According to a disclosed embodiment, the method may be performed by a system configured to intercept a network traffic directed to one or more one or more access-controlled network resources.

According to a disclosed embodiment, method may be performed by a system that securely maintains the data associated with the at least one identity.

According to a disclosed embodiment, the method may be performed by a system remote from a secure credentials repository that securely maintains the data associated with the plurality of authentication credentials.

According to a disclosed embodiment, the control action may include one or more of: disabling network access for the at least one identity; monitoring activity of the at least one identity; rotating the authenticating credential data; modifying the access permissions for the at least one identity; displaying a request for re-authentication to the at least one identity; or registering the new authentication credential data in a credential repository.

According to a disclosed embodiment, the control action may be performed on the access-controlled resource, and may include at least one of: isolating the access-controlled resource from the network, suspending the access-controlled resource, performing forensic analysis, and restoring previous states of the access-controlled resource.

Aspects of the disclosed embodiments may include tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor (s) based on software instructions that are programmed with logic and instructions that perform, when executed, one or more operations consistent with the disclosed embodiments.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Figure 1:
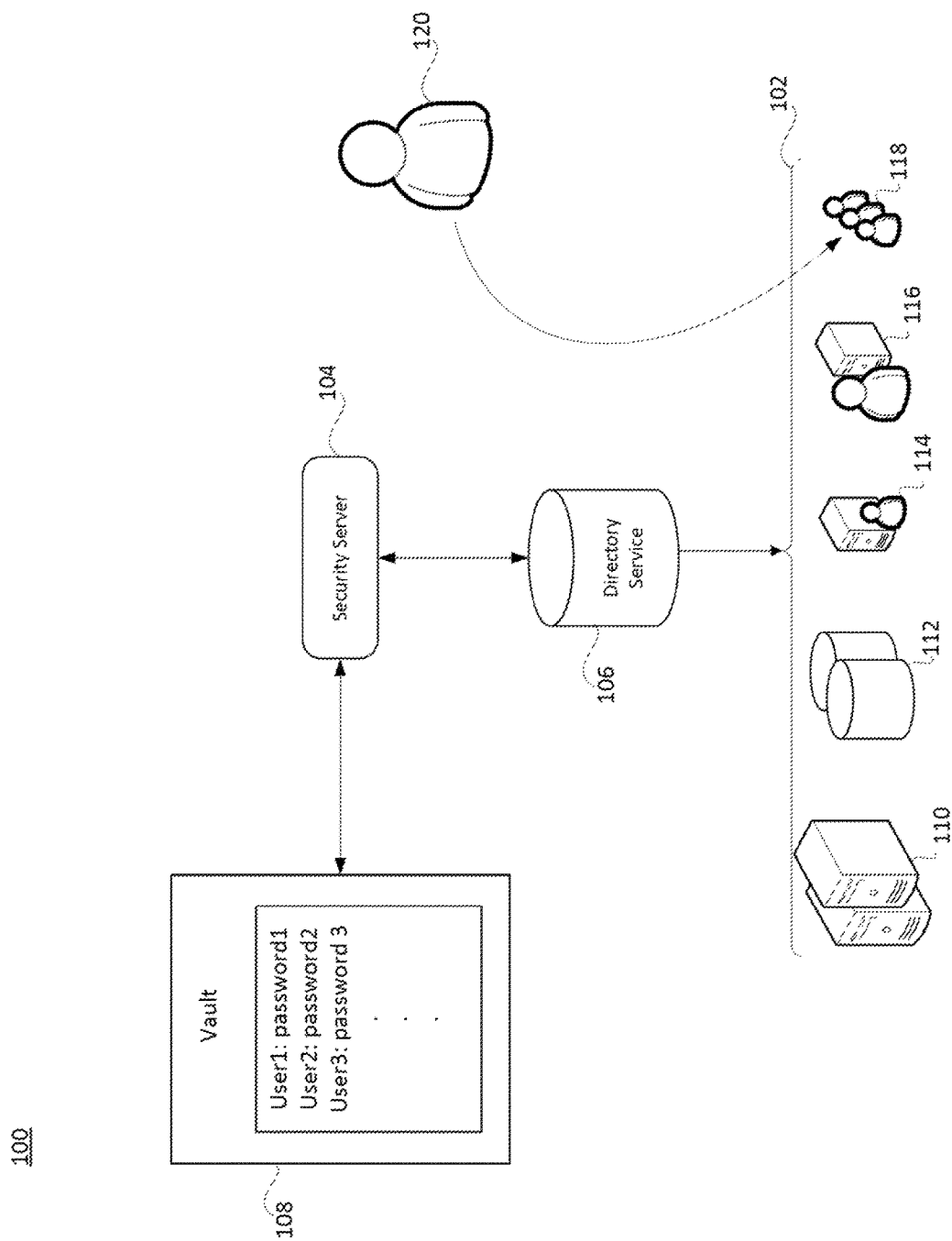
FIG. 1 is a block diagram of example system for controlling use of authentication credentials in accordance with disclosed embodiments.

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

The various implementations described herein overcome many vulnerabilities and deficiencies of network security techniques with respect to credential and/or privilege management. The described techniques for controlling changes to authentication credentials may detect and prevent unauthorized credential change, while allowing authorized credential changes to occur seamlessly.

Reference will now be made in detail to the disclosed embodiments, examples of which are illustrated in the accompanying drawings.

Described herein are systems and methods for controlling changes to authentication credentials, which may be used to obtain access to access-restricted resources. Network environments may include access-restricted resources such as databases storing sensitive data, software development environments, restricted-use applications, secure web hosting servers, among various other types. Network administrators often attempt to maintain network security by rotating passwords on a regular basis, making it more difficult for an attacker to guess or to brute-force calculate the password of an account or resource associated with the network. However, networks are not currently safeguarded against the threat of an insider or attacker changing credentials from a compromised secured account. Moreover, networks are not able to selectively prohibit this form of improper privilege modification while still permitting legitimate privilege changes.

Current methods of preventing unauthorized credential change focus on securing and eliminating the "change credentials" permission in advance. For example, if all the accounts with the permission to reset or change a password are secured and operating in a legitimate way, then the risk of unauthorized credential change may be lessened. However, there is still a risk of a rogue insider or a potential outside attacker who might take a secured account and perform an unauthorized action with it.

Other approaches may scan a network and revoke the permissions of resetting or changing passwords from potentially compromised network entities. However, because reset or change password functionality is needed in the regular operation of an organization, certain accounts require these permissions. For example, a privileged account may be required to reset user passwords according to the network's security practices or if a user forgets his password. These and other shortcomings in existing approaches are solved through the techniques discussed below.

FIG. 1 depicts an exemplary system 100 of a network configuration. For example, system 100 can include network environment 102, central policy manager (CPM) 104, directory service 106, and credential vault 108, among other resources. Network environment 102 can be configured, for example, to host network resources including one or more servers 110, databases 112, workstations 114, user devices 116, user accounts 118, etc.

Network environment 102 can include a cloud-computing platform, consistent with disclosed embodiments. Examples of suitable cloud-computing platforms include, but are not limited to, Microsoft Azure™, Amazon Web Services (AWS)™, Google Cloud Platform™, IBM Cloud™, and similar systems. Further, network environment 102 may be an on-premises network of an organization, or a combination of an on-premises and a cloud-based network. Network environment 102 can be configured to associate permissions or privileges with entities deployed to network environment 102, such as identities 110-120. As a non-limiting example, when network environment 102 is an AWS-based network, network environment 102 can use AWS Identity and Access Management (IAM)™ to define permissions for entities deployed to network environment 102.

Network environment 102 may include one or more access-restricted resources, e.g., servers 110, databases 112, workstations 114, user devices 116, user accounts 118, or other access-restricted identities. A network resource may be, for example, any secure device, application, database, virtualized computing instance, or network that requires an identity to be authenticated before accessing the resource. An identity may be, for example, any account, person, machine, IoT device, application, or entity attempting to access a resource, such as a database, server, storage device, another identity, etc. in the network environment 102, such as resources 110-120, among others. Other exemplary network resources may be, for example, an IoT device, a personal computing device, a smartphone, a vehicle infotainment system, computer-embedded clothing, a building, an automated teller machine (ATM), a website, a mobile application, or various other types of network-accessible resources. In some embodiments, network resources (e.g., servers 110, databases 112, workstation 114, user devices 116, and user accounts 118) may require authentication, such as through the use of a privileged credential, e.g., password, SSH key, symmetric (e.g., public/private) key, or other type of cryptographic data or privileged access token, in order for another identity to access them.

Security server 104 may be a system including one or more processors configured to interact with network environment 102 to update and manage credentials for access-restricted resources (e.g., servers 110, databases 112, workstation 114, user device 116, and user accounts 118). Security server 104 may interact with access-restricted network resources through, or by reference to, directory service 106 (e.g., Microsoft Active Directory™ or Amazon Cloud Directory™) that enforces security policies of network environment 102. Security server 104 may securely store and update credentials in vault 108, such as passwords, keys, tokens, certificates, and other privilege data. In some embodiments, vault 108 may store other forms of data associated with one or more identities. For example, this may include one or more of unique identity identifiers, names, group information, dates (e.g., an identity's creation date), a historical access log, assigned permissions, previous connected IP addresses, activity properties, a profile picture, or various other attributes or data associated with an identity as described in further detail below. Accordingly, vault 108 may store sensitive data, such as passwords or other credentials as described above, as well as other forms of non-sensitive data. Further, although vault 108 is used throughout the present disclosure as an example storage location, it is to be understood that some or all of the data (including sensitive and non-sensitive data) may be stored in another storage location. Accordingly, this data may be accessed from another storage location within system 100, from a storage location external to system 100, or any combination thereof.

Vault 108 may be one or more databases storing credential information for one or more access-restricted network resources in network environment 102. Vault 108 may include one or more memory devices that store information and are accessed and/or managed through security server 104. By way of example, vault 108 may include Oracle™ databases, Sybase™ databases, or other relational databases or non-relational databases, such as Hadoop sequence files, HBase, or Cassandra. The databases or other files may include, for example, identities and permission policies, network resources accessed by an identity, an identity's attempt to access a network resource, and the like. Systems and methods of disclosed embodiments, however, are not limited to separate databases. Vault 108 may include computing components (e.g., database management system, database server, etc.) configured to receive and process requests for data stored in memory devices of vault 108 and to provide data from vault 108.

In the system 100 of FIG. 1, an attacker 120 may gain access to access-restricted network resources by compromising an identity 118 in network environment 102. For example, attacker 120 may guess or calculate an identity's password, and otherwise steal the password, and use the password to access network resources from that identity's account. In another example, attacker 120 may be an insider associated with an identity 118 in network environment 102 and thus have a valid password for an account with permissions to modify or create credentials for other identities in network environment 102. Once attacker 120 obtains a password for an identity (e.g., identity 118) with permissions to modify or create credentials and/or privileges for other identities in network environment 102, the attacker 120 may modify or create credentials and/or privileges, access secure resources, or access sensitive information without detection.

Figure 2:
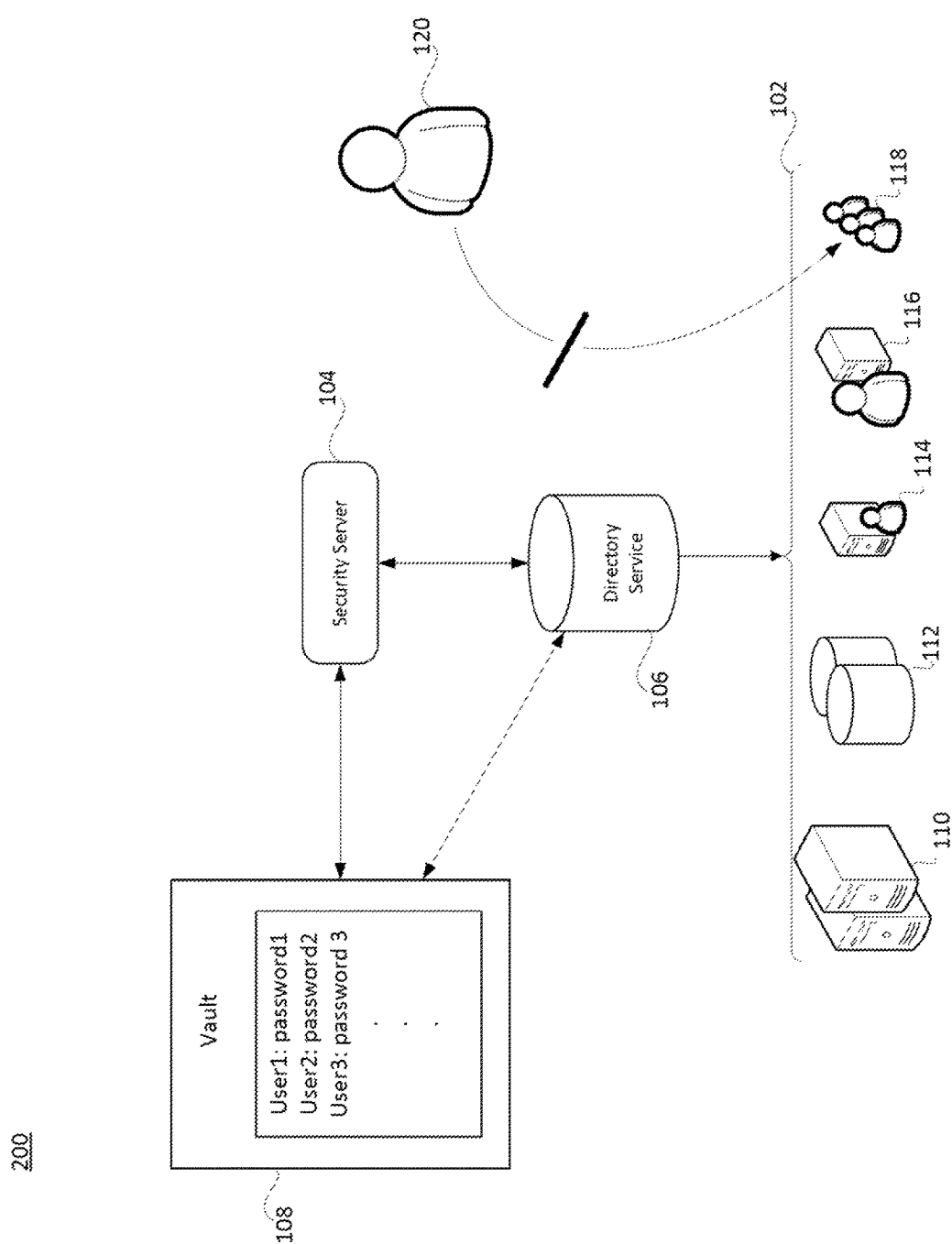
FIG. 2 is a block diagram of another example system for controlling use of authentication credentials in accordance with disclosed embodiments.

FIG. 2 depicts an exemplary system 200 in which modifications to credentials and/or privileges must be validated by security server 104 before being accepted and stored in vault 108. For example, in such a situation, the system 200 (e.g., via security server 104) blocks credential changes that are not initiated by the security server 104. Thus, even if an attacker 120 successfully gains control of an identity 118 account in the network environment 102, any attempts by the attacker 120 to manipulate or modify credentials will be denied, as discussed further below.

For example, in system 200, the generation of a new credential can be performed only by an entity (e.g., security server 104) having knowledge of all (or a defined group) of the credentials or other data stored in vault 108, and knowing the secret logic algorithm required for calculating the secret data element of a credential. The credential generation process may involve creating new credentials based on the other existing credentials or data according to the secret logic algorithm. The secret logic algorithm may generate a secret data element that is unique to each credential, password, key, token, etc. In some embodiments, the secret data element is unique to a system environment (e.g., unique to an AWS™ or Azure™ environment, portion of an on-premises network, etc.). The secret data element may be calculated at the security server 104 based on the secret logic known only to security server 104. Once the secret data element is calculated, the secret data element may be embedded in each new valid generated credential, password, key, token, etc. Thus, each new generated credential, password, key, token, etc. may have a different and randomized secret data element. Once new credentials are generated, a validation process may determine whether the new credential contains the secret data element.

Figure 3:
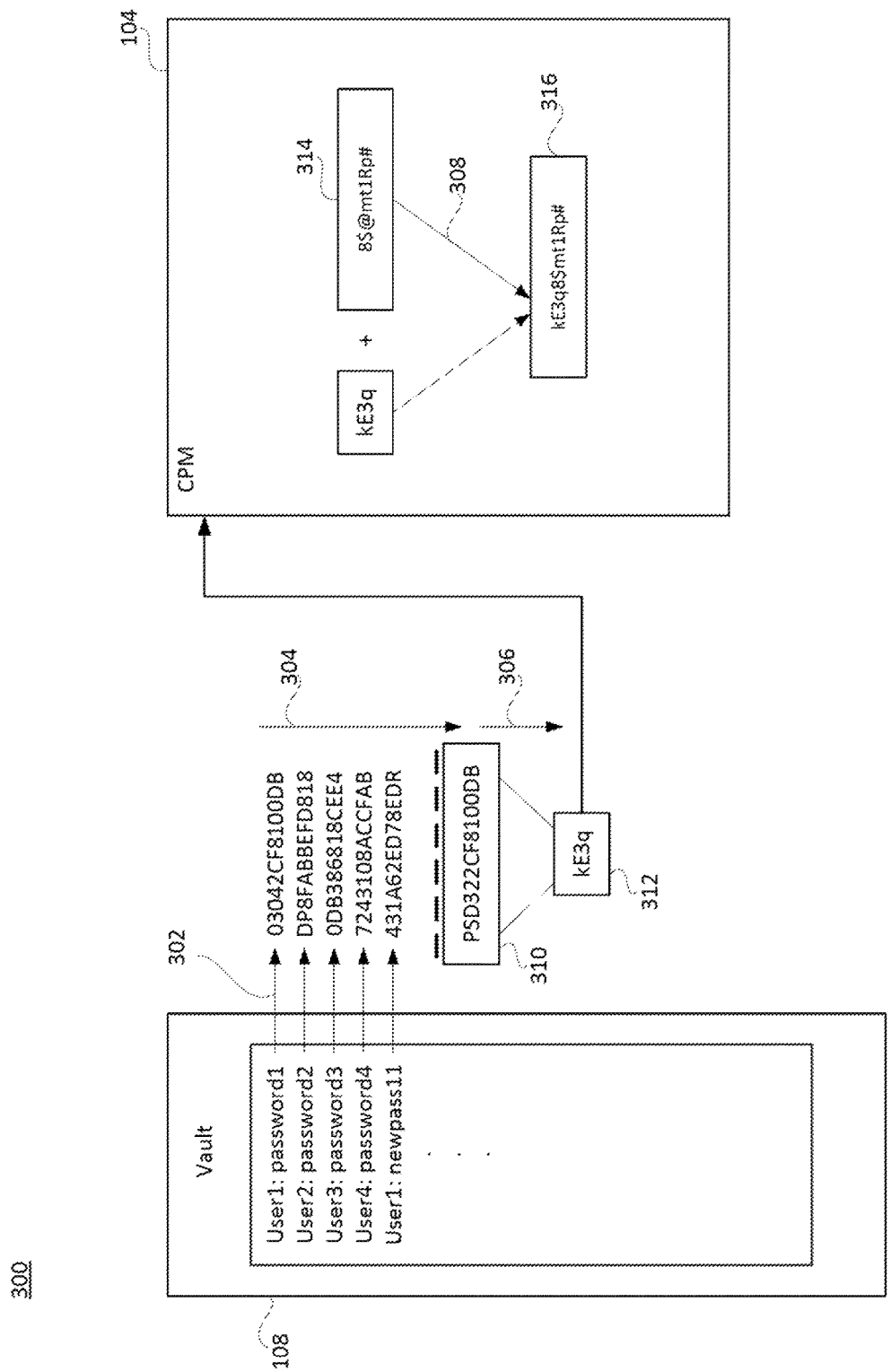
FIG. 3 is an example process flow diagram illustrating a technique of controlling use of authentication credentials in accordance with disclosed embodiments.

FIG. 3 depicts an exemplary process 300 for generating a secret data element in a system 200, consistent with disclosed embodiments. In this example, vault 108 may store credentials (e.g., passwords, etc.) associated with multiple users of the system. For example, this may include passwords for "User1," "User2," "User3," and "User4," as shown. While an attacker, e.g., attacker 120, may only have access to the password corresponding to either his own account (e.g., if the attacker is an insider) or a compromised account, the security server 104 has access to all credentials/passwords of the network environment 102 that are stored in the vault 108. Additionally, only the security server 104 has access to the secret logic algorithm. Therefore, a potential attacker or a malicious insider cannot create valid passwords for target accounts.

At step 302, the system, e.g., through security server 104, may generate or access an individual hash of each credential/password stored in vault 108. In some embodiments, security server 104 may access the actual password stored in vault 108. Step 302 may be performed periodically (e.g., daily, monthly, etc.) in some embodiments. In other embodiments, step 302 may be performed upon demand (e.g., upon detection of a request for access to an access-restricted resource 110-118).

At step 304, the system 200 (e.g., through security server 104) may generate an intermediate value 310 from a set of one or more of the passwords or hashed passwords generated or accessed in step 302. For example, the intermediate value 310 may be generated using a password-dependent hash solution. In some embodiments, a password "blockchain" can be used in which every created block for each newly added password is connected or linked to another block. The intermediate value 310 resulting from the dependent hash of the password chain may be only known to security server 104, which knows all the passwords (from the beginning of the chain) that are stored in vault 108.

In another embodiment, the intermediate value 310 may be generated using a Merkel Tree hash, improved/advanced Merkel tree hash, or similar hashing tree technique that is constructed based on all the known password information. In another embodiment, the intermediate value 310 may be generated by concatenating all the passwords (e.g., previously stored passwords in vault 108) together and then performing a single hash. In another embodiment, the intermediate value 310 may be generated by calculating a sum of all the passwords, encrypting the sum, and storing a portion of the result. The portion that is stored by security server 104 may be chosen arbitrarily (e.g., the first several characters), based on a predefined portion, based on a designated portion that may change, etc.

At step 306, security server 104 generates a secret data element 312 by applying the secret logic algorithm, known only to security server 104, to intermediate value 310. The result may be stored in vault 108 or separately by security server 104. Thus, each password stored by vault 108 has a secret data element 312 that is unique and randomized since the secret data element depends on what passwords are stored in the vault 108 at the time of the new password generation. In some embodiments, hashes may be shared across the security server 104, directory service 106, vault 108, and the like. Further, in some embodiments, only a subset of passwords stored in vault 108 are used to compute a secret data element.

At step 308, security server 104 combines the secret data element 312 with one or more random bytes 314. The random bytes 314 may be generated, for example, through a random number generator, based on a defined cycling algorithm, etc. For example, the secret data element 312 may be concatenated with the random bytes 314 to form new password 316. In other embodiments, the secret data element 312 may be inserted into random bytes 314. In another embodiment, the random bytes 314 may be concatenated with secret data element 312.

Figure 4:
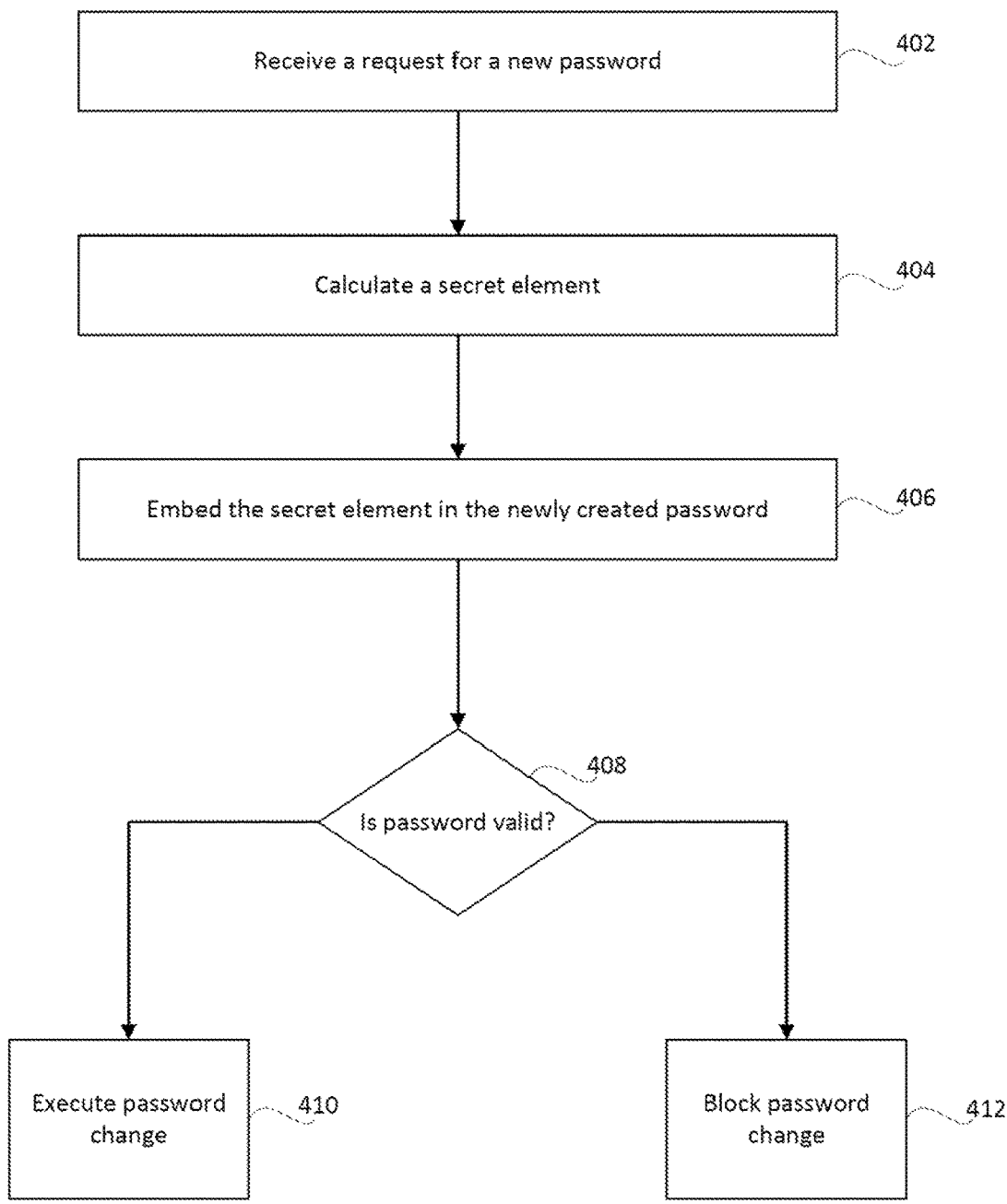
FIG. 4 is an example process flow diagram illustrating a technique of secure element calculation and password validation in accordance with disclosed embodiments.

FIG. 4 depicts an exemplary process 400 for generating and validating a new credential, password, token, key, etc. in a system (e.g., system 100 or 200), consistent with disclosed embodiments. In some embodiments, process 400 may be implemented via security server 104.

At step 402, security server 104 may receive a request for a new credential, password, token, key, certificate, etc. For example, security server 104 may receive an indication to rotate a password according to the network environment 102's security policy. The security policy may require a periodic update of passwords, an event-based update (e.g., based on a potential security threat, a request for access to an access-restricted resource, etc.), or another type of update. In another embodiment, an administrator may create a new account associated with an identity in network environment 102, thereby causing the security server 104 to initiate password generation for the new account.

At step 404, security server 104 may calculate a secret data element as described above with reference to FIG. 3. For example, as discussed above, the secret data element may be calculated based on a credential-dependent algorithm, a blockchain-based technique, a Merkel Tree technique, an advanced Merkel Tree technique, or other techniques.

At step 406, security server 104 may embed the secret data element in the newly created password as described in step 308 described with reference to FIG. 3. The secrete data element may be combined with random bytes, or in other combinations, as discussed above in connection with FIG. 3.

At step 408, security server 104 may validate the new password containing the secret data element. For example, if an account requests a password change on a domain controller (DC) (e.g., in response to an identity seeking access to an access-restricted network resource), the password may first be validated by a solution agent installed on the DC or on another target credential host. In some embodiments, the DC is integrated into the security server 104. In some embodiments, the agent may run other tasks as well and may not be solely dedicated to the validation process. The validation of the password by the solution agent will determine whether the newly generated password contains the secret data element. In some embodiments, the secret data element created by the vault is shared with the solution agent in advance.

In another embodiment, the solution agent may query the vault 108 for the secret data element "on-demand." For example, when a new password is being generated the solution agent may query the vault 108 on the specific account for which the password is going to be changed or created. The vault 108 may return the secret data element, which is in turn validated by the solution agent. In some embodiments, the communications between the vault 108 and the solution agent occur on top of secured and encrypted communication sessions (e.g., HTTPS).

In some embodiments, the secret data element may be embedded in the new password in multiple places and the agent will know how to detect it. For example, the secret data element may be added at the beginning of the newly requested password or embedded in the middle\end. The secret data element may be embedded in the same manner each time a new password is generated, or differently each time.

In another embodiment, a validation component can be installed before the DC in an inline network architecture, e.g., as a proxy. A request to the DC, for example, to change a password, may be directed through the validation component. The network commands to change the password may not be sent to the DC unless the validation component successfully validates the new password. In other embodiments, a third-party vendor, for example, providing a firewall, may implement a validation process that is built into the firewall's firmware.

If the new password is validated, at step 410, the new password is stored in vault 108 as a valid credential. However, if the new password is not valid, at step 412, system 200 may block the generation of the password. In some embodiments, system 100/200 (e.g., through security server 104) may generate an alert to send to one or more system administrators or a security team indicating that an unauthorized attempt to modify a password was made by a potential attacker.

As an exemplary implementation, 95% of the privileged accounts belonging to an organization may be managed securely with a password manager solution, e.g., security server 104, meaning that their respective passwords are stored securely, are not accessible from other accounts, are monitored, and the like. However, 5% of the organization's accounts may not be managed. If one of the non-managed privileged accounts is compromised, an attacker can reset the passwords for all the other 95% privileged accounts, as described with reference to FIG. 1. In this example, there is no safeguard mechanism for preventing unauthorized credential change. However, employing a system 200 having the configuration of that described with reference to FIG. 2, the attacker cannot change the passwords of the other privileged accounts because the attacker does not know the secret algorithm to determine the secret data element nor does the attacker know where to embed the secret data element within the new password. Further, even if the attacker were to guess or replicate the secret algorithm, the attacker could not calculate the secret data element because said calculation requires the attacker to know all the other password of all the other accounts. Thus, the attacker's malicious actions are limited to the specific compromised account. Moreover, when the attacker tries to change the password of another privileged account, the security server may detect the failed password change, block the change, and alert the security team of the organization. The alert may allow the security team to investigate the blocked request and mitigate the damage from the attack by discovering and eliminating the specific compromised account. Further, the security server may implement this restriction on improper password changes, while still permitting password changes that are allowable (e.g., those based on the calculated secret element).

In another example, the attacker may be a rogue employee who has authorized access to only 10% of the organization's privileged accounts, some of which are managed by the security server. As described above, even though the employee may access certain privileged accounts, the employee cannot create or modify passwords stored in the vault 108 without knowing every password stored in vault 108. The attacker is thus not able to compromise additional privileged accounts.

In another example, a newly installed application on organization systems may contain a bug causing the application to send a password change request to the DC. The system may detect the inadvertent password change, determine the request did not originate from the security server 104, and block the password change from proceeding. Accordingly, the bug will still not enable the attacker to change additional passwords.

Figure 5:
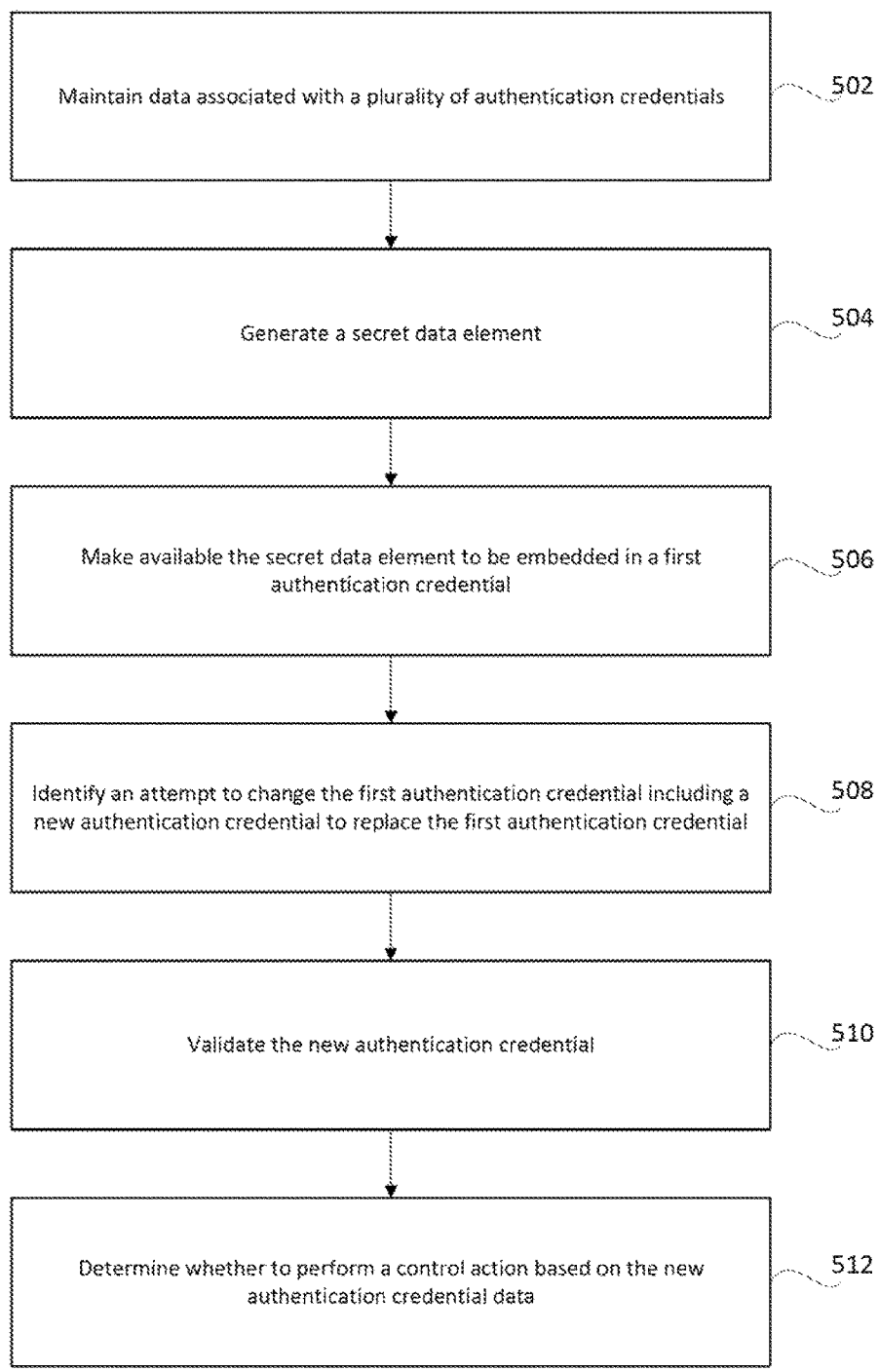
FIG. 5 is an example process flow diagram illustrating a technique of controlling use of authentication credentials in accordance with disclosed embodiments.

FIG. 5 is an exemplary process 500 for controlling changes to authentication credentials, consistent with disclosed embodiments. Process 500 may be executed, for example, by systems 100/200 as described with reference to FIGS. 1 and 2. In some embodiments, process 500 is performed by an agent on a DC in communication with a secure credentials repository, e.g., vault 108, that securely maintains the data associated with a plurality of authentication credentials. In another embodiment, process 500 is performed by a system that securely maintains the data associated with the plurality of authentication credentials, e.g., system 200, via security server 104. In some embodiments, the system may be remote from a secure credentials repository that securely maintains the data associated with the plurality of authentication credentials.

At step 502, the system may securely maintain data associated with a plurality of authentication credentials, e.g., data stored in vault 108, that are useable by a plurality of identities to obtain access to one or more access-controlled network resources, e.g., servers 110, databases 112, workstations 114, devices 116, accounts 118, and/or the like. In some embodiments, the data associated with the authentication credentials may include a plurality of hashes indicative of and/or data derived from passwords, keys, credentials, etc., associated with the plurality of identities. In some embodiments, the data may include a plurality of hashes of authentication keys. In other embodiments, the data that is stored include the actual passwords, keys, credentials, etc.

As previously described, in some embodiments, the data associated with the plurality of authentication credentials is maintained in a common ledger that stores updates to the plurality of authentication credentials. For example, as discussed above, a blockchain-based authentication technique may be used for determining am approved password-change process.

At step 504, the system may generate a secret data element as a function of the data associated with a selected group of the plurality of authentication credentials. Each secret data element may be distinct and uniquely associated with an authentication credential and may contain a randomized data portion. As previously described with reference to FIG. 2, the secret data element may be generated by performing a tree hashing function on the data associated with the plurality of authentication credentials. In another embodiment, the secret data element may be generated by concatenating two or more elements of the data associated with the plurality of authentication credentials and performing a hashing function on the concatenated data elements. In another embodiment, generating the secret data element may include performing a summation function of the data associated with the authentication credentials. Various other techniques for generating the secret data element are possible as well, as discussed above.

At step 506, the system may make the secret data element available to be embedded in a first authentication credential. As previously described, the location at which to embed the secret data element may be known only to security server 104.

At step 508, the system may identify an attempt to change the first authentication credential. The attempt may include, for example, new authentication credential data to replace the first authentication credential. In some embodiments, the attempt may be an attempt by an identity to access an access-restricted network resource. Such an attempt may occur as part of a malicious attack on a network environment or inadvertently due to user error or a bug in software used by the network environment.

At step 510, the system may validate the new authentication credential data based on whether the new authentication credential data includes the secret data element. In some embodiments, step 510 may further include determining if the new authentication credential data includes the secret data element in a predefined location.

At step 512, the system may determine, based on the validation of step 510, whether to perform a control action based on the new authentication credential data. In some embodiments, the control action may include rejecting the new authentication credential data if the secret data element was not validated in step 510. If the secret data element was not validated, the control action may also include generating an alert identifying the new authentication credential data. If the secret data element was not validated, the control action may include disabling network access for an identity associated with the new authentication credential data or monitoring activity of the identity.

If the secret data element is successfully validated at step 510, at step 512 the system may register the new authentication credential data in the credential repository.

In some embodiments, the same or similar processes for generating new credentials or controlling changes to credentials may be performed using other forms of attributes or data stored in vault 108 (or various other storage locations) instead of or in addition to sensitive data. For example, while processes 300, 400, and 500 are described using stored credentials for a plurality of users to generate a secret data element, it is to be understood that this is provided by way of example, and various other forms of data may be used. Accordingly, a secret data element may be generated based on any data included in vault 108 that attacker 120 would not have access to. For example, this may include attributes or other non-sensitive data associated with one or more identities that are securely maintained within vault 108. As another example, a combination of sensitive data and non-sensitive data may be used.

Figure 6:
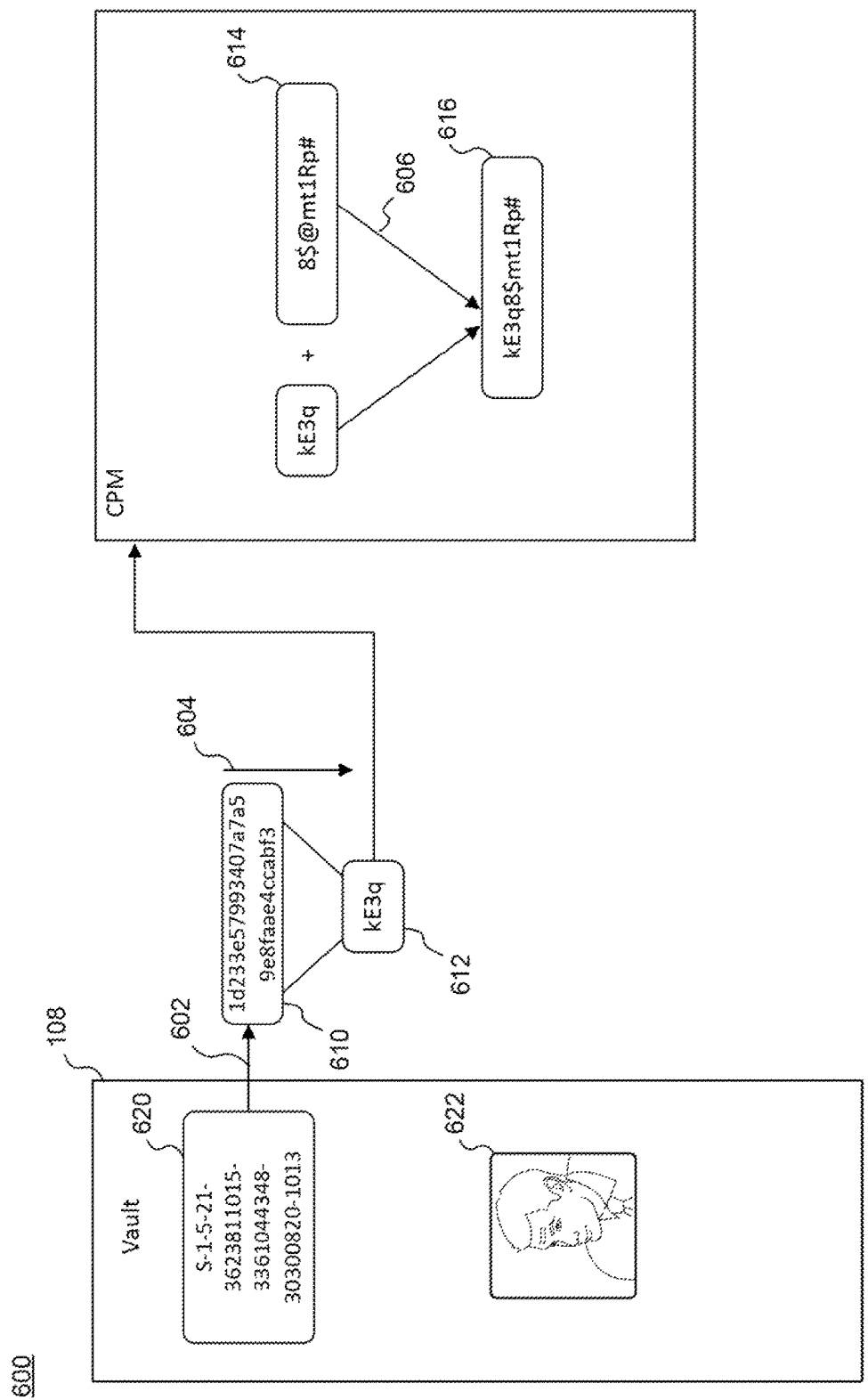
FIG. 6 illustrates an example process for generating a secret data element based on non-sensitive data, consistent with disclosed embodiments.

FIG. 6 illustrates an example process 600 for generating a secret data element based on non-sensitive data, consistent with disclosed embodiments. As used herein, non-sensitive data may refer to any data other than credentials used to authenticate an identity. The non-sensitive data may be securely maintained or accessed by system 100, similar to the credentials described above with respect to process 300. While FIG. 6 (and FIG. 7, descried below) illustrate storing non-sensitive data in vault 108, it is to be understood that this data may not necessarily be stored in a credentials vault. For example, non-sensitive data may be stored in various other locations within system 100. For example, security server 104 may access a storage location separate from vault 108 including one or more forms of non-sensitive data. Further, in some embodiments, one or more forms of non-sensitive data may be stored external to system 100. Accordingly, security server 104 may access sensitive or non-sensitive information from an external storage location. For example, this may include an external database, a cloud storage platform, an external server, or the like. Security server 104 may access this data manually, or by automated means (e.g., periodically, based on receiving a request associated with a credential, etc.).

While an attacker (e.g., attacker 120) may gain access to a password or other credentials corresponding to either his own account (e.g., if the attacker is an insider) or a compromised account, the attacker may not have access to other information associated with the compromised account (or various other accounts). Security server 104, on the other hand, may have access to all unsecured data of the network environment 102 as well as the secret logic algorithm, which may be used to generate secret data elements. Therefore, a potential attacker or a malicious insider may be unable to create valid passwords for target accounts.

Various forms of non-sensitive data (or combinations thereof) may be used to generate a secret data element. In some embodiments, the non-sensitive data may be associated with a single identity. Accordingly, rather than accessing credentials for multiple identities, more general information associated with a single identity may be used to generate secret data elements. This may be beneficial, for example, when access to credentials from multiple identities is inaccessible. Further, the identity associated with the non-sensitive data may not necessarily be the identity associated with a request for new credentials. For example, if an identity 118 is requesting to change a credential, non-sensitive data from another identity within system 200 may be used. While the disclosed embodiments may be performed using non-sensitive data from a single identity, it is to be understood that non-sensitive data associated with multiple identities may equally be used, similar to with the credentials described above.

In some embodiments, system 100 may access an identifier 620 associated with an identity. As with other forms of non-sensitive data, identifier 620 may be stored in vault 108 or another storage device within system 100, or may be accessed by system 100 from an external storage location. Identifier 620 may include any form of alphanumeric string or other information that uniquely or semi-uniquely identifies an identity. For example, identifier 620 may be a Security Identifier (SID) used to uniquely identify an identity or security group within an operating system. For example, a user may be assigned a single SID, and all properties of the user, including its name, groups and more, may be associated with the SID. In the example of a Windows™ operating system environment, an SID may be represented as "S-1-5-21-3623811015-3361044348-30300820-1013," as shown in FIG. 6. In this example, the SID may include a lateral prefix "S-1," an identifier authority "5," a sub-authority "21" indicating a class of ID, three sub-authorities "3623811015-3361044348-30300820" for uniqueness, and a relative ID "1013." It is to be understood that various other identifier formats may be used, depending on the particular implementation.

At step 602, system 200 (e.g., through security server 104) may generate or access a hash 610 of identifier 602 stored in vault 108. For example, this may include applying a cryptographic hash algorithm, such as MD5, SHA-1, SHA-2, SHA-3, RIPEMD-160, Whirlpool, BLAKE2, BLAKE3, or various other forms of cryptographic hash algorithms. Step 602 may be performed periodically (e.g., daily, monthly, etc.) in some embodiments. In other embodiments, step 602 may be performed upon demand (e.g., upon detection of a request for access to an access-restricted resource 110-118). In some embodiments, hash 610 may be generated based on a specified subset of identifier 620. For example, system 200 may generate hash 610 based on one or more sub-authorities or other predefined ranges of information within identifier 620.

At step 604, security server 104 may generate a secret data element 612 by applying the secret logic algorithm, known only to security server 104, to hash 610. The result may be stored in vault 108 or in a separate storage location accessible by security server 104. In some embodiments, hashes may be shared across the security server 104, directory service 106, vault 108, and the like. Further, in some embodiments, only a subset of passwords stored in vault 108 are used to compute a secret data element 612.

In some embodiments, process 600 may include a step 606, in which security server 104 combines the secret data element 612 with one or more random bytes 614. As with random bytes 314, described above, random bytes 614 may be generated, for example, through a random number generator, based on a defined cycling algorithm, etc. For example, the secret data element 612 may be concatenated with the random bytes 314 to form new password 616. In other embodiments, the secret data element 612 may be inserted into random bytes 614, or vice versa.

While process 600 is described using an identifier 620 by way of example, various other attributes or data associated with an identity may be used. For example, this may include an image 622 associated with an identity, such as a profile picture, a badge, a logo, or various other images. The image may be represented in a storage medium as a byte sequence, which may have different formats depending on the image file format. For example, this may include raster formats (e.g., JPEG, GIF, BMP, PNG, or other image formats), vector formats (e.g., SVG, etc.), compound formats, stereo formats, or any other suitable formats for representing an image. The byte sequence used to represent image 622 may be hashed in various ways to generate hash 610. For example, this may include generating a hash of the entire byte sequence, generating a hash of a portion of the byte sequence (e.g., a predetermined range of values at the beginning, middle, or end of the byte sequence, etc.), generating multiple hashes of portions of the byte sequence and combining them, or the like. Various other categories of data may be used to generate hash 610, which may include but are not limited to, a name of the identity, a unique identifier of a group associated with the identity, a creation date associated with the identity (e.g., a date the identity was added to system 200, etc.), a subsequent date associated with the identity (e.g., a date a password was last changed, a date a control action occurred, etc.), a historical access log of the identity (e.g., including dates or times of access and/or resources that were accessed), a permission assigned to the identity, a network address associated with the identity, properties of an activity performed by the identity, or any other information with respect to identity that may be tracked and/or stored. Any of these categories of data, or portions and/or combinations thereof may be used to generate a hash.

Figure 7:
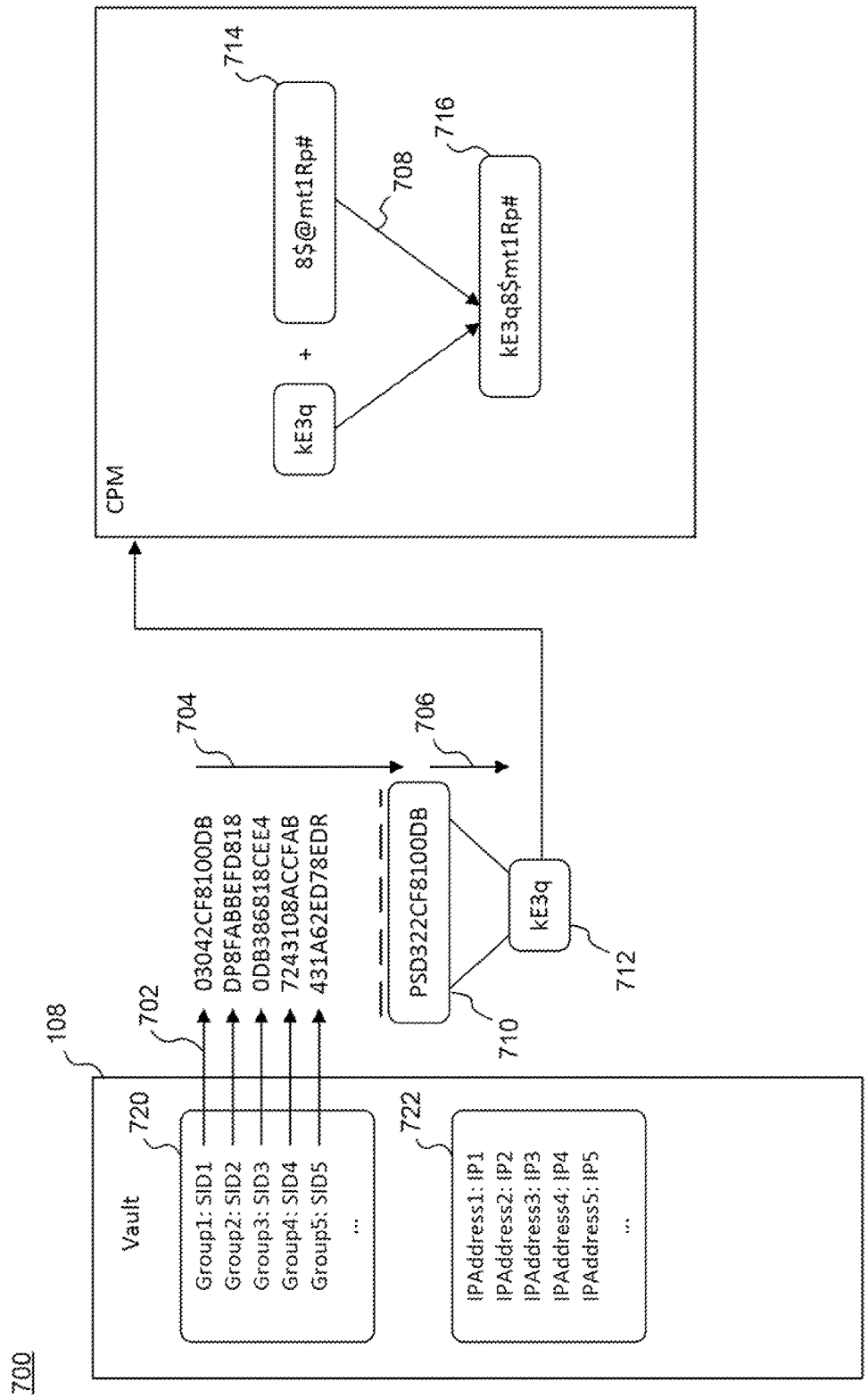
FIG. 7 illustrates another example process for generating a secret data element based on non-sensitive data, consistent with disclosed embodiments.

In some embodiments, a category of data may have multiple data elements, which may be used to generate a secure data element, similar to with multiple credentials, as described above with respect to FIG. 3. FIG. 7 illustrates another example process 700 for generating a secret data element based on non-sensitive data, consistent with disclosed embodiments. In this example, a list of groups 720 to which an identity belongs may be used to generate a hash 710. For example, an identity may belong to "Group1," "Group2," "Group3," "Group4," and "Group5," as shown in FIG. 7. Each group may be represented by an identifier, which may include an SID for the group as described above, a name of the group, or various other properties of the group.

At step 702, system 200, e.g., through security server 104, may generate or access an individual hash of each group ID stored in vault 108 (or another storage location). At step 704, system 200 may generate an intermediate value 710 from a set of one or more of the hashed group IDs generated or accessed in step 702. For example, the intermediate value 710 may be generated using a group-dependent hash solution. For example, intermediate value 710 may be generated using a Merkel Tree hash, improved/advanced Merkel tree hash, or similar hashing tree technique that is constructed based on all the known group information 720 for an identity. In another embodiment, intermediate value 710 may be generated by concatenating all the hashed group information 720 together and then performing a single hash. In another embodiment, intermediate value 710 may be generated by calculating a sum of all of group information 720, encrypting the sum, and storing a portion of the result. The portion that is stored by security server 104 may be chosen arbitrarily (e.g., the first several characters), based on a predefined portion, based on a designated portion that may change, etc.

At step 706, security server 104 may generate a secret data element 712 by applying the secret logic algorithm, known only to security server 104, to intermediate value 710. The result may be stored in vault 108 or separately by security server 104. In some embodiments, hashes may be shared across the security server 104, directory service 106, vault 108, and the like. Further, in some embodiments, only a subset of group information 720 stored in vault 108 may be used to compute secret data element 712.

At step 708, security server 104 may combine the secret data element 712 with one or more random bytes 714 to form password 716, similar to password 616 described above. Accordingly, password 716 may include a secret data element 712 that is unique and randomized since secret data element 712 depends on what groups the identity belongs to at the time of the new password generation.

Various other categories of information having multiple data elements may be used. For example, in some embodiments, secret data element 712 may be generated based on network address information 722 associated with an identity. Network address information 722 may include a historical list of network addresses used to access to system 200. For example, this may include internet protocol (IP) addresses associated with an identity such as an office IP address, a home IP address, as well as any other IP addresses used to access the system (e.g., associated with a coffee shop, a mobile device, an airport, a client's office, a spouse's computer, etc.). Similar to with group information 720, an intermediate value 710 may be generated by hashing each IP address individually and combining the results (or a subset of the results), combining each IP address (or a subset of addresses) and hashing the combined result, or any other techniques described throughout the present disclosure. Various other categories of data having multiple elements may be used. For example, similar techniques may be applied to multiple images, multiple identifiers, or the like.

While various examples are provided above, any other form of data associated with an identity may be used to generate a secret data element, which may include various hashing functions, intermediate values, or other techniques as described above. In some embodiments, the data associated with an identity may include a combination of two or more categories of data. For example, a secret data element may be generated based on identifier 620 and image 622. This may include generating individual hashes of identifier 620 and image 622 and combining them to generate an intermediate value (or combining them first and generating a hash of the combination). In some embodiments, subsets of various categories may also be used in combination to generate the secret data element. For example, this may include hashing a subset of group information 720 and a subset of network address information 722, which may be used to generate intermediate value 710. In some embodiments, the secret data element may be generated based on a combination of sensitive and non-sensitive data. For example, this may include a combination of one or more credentials and one or more IP addresses in network address information 722. Further, while the various examples are described above with respect to a single identity, it is to be understood that non-sensitive data from multiple identities (and various combinations thereof) may equally be used.

Figure 8:
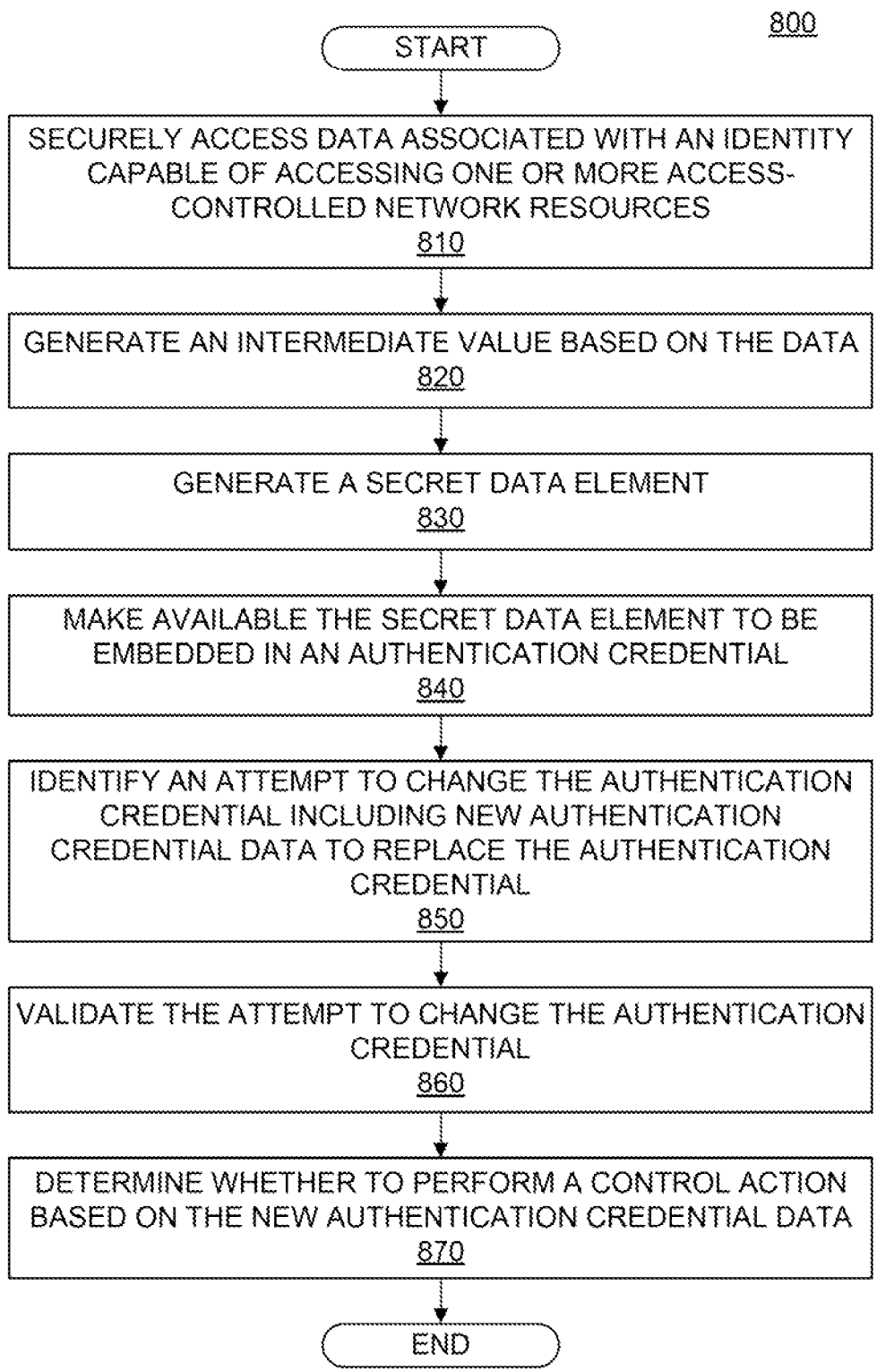
FIG. 8 illustrates an example process for controlling changes to authentication credentials, consistent with the disclosed embodiments.

FIG. 8 illustrates an example process 800 for controlling changes to authentication credentials, consistent with the disclosed embodiments. Process 800 may be performed by at least one processing device of a server, such as a processor of server 104, as described above. In some embodiments, some or all of process 800 may be performed by another system or device, which may include an agent on one or more access-controlled network resources, a credential validation resource associated with a secure credentials repository that securely maintains data associated with the at least one identity, a system configured to intercept a network traffic directed to one or more one or more access-controlled network resources, a system that securely maintains the data associated with the at least one identity, a system remote from a secure credentials repository that securely maintains the data associated with the plurality of authentication credentials, or various other systems.

In some embodiments, a non-transitory computer readable medium may contain instructions that when executed by a processor cause the processor to perform process 800. Further, process 800 is not necessarily limited to the steps shown in FIG. 8, and any steps or processes of the various embodiments described throughout the present disclosure may also be included in process 800, including those described above with respect to, for example, processes 300, 400, 500, 600, and 700.

In step 810, process 800 may include securely accessing data associated with at least one identity capable of accessing one or more access-controlled network resources. For example, this may include accessing the data associated with the at least one identity from vault 108. According to some embodiments, the data may be accessed from multiple locations. For example, a portion of the data may be stored in vault 108 whereas other portions of the data may be stored in other secured locations, which may be internal or external to system 200. Various forms or categories of data may be accessed in step 810, as described above. For example, this may include at least one of identity representation information, identity origin information, group relationship information, or identity historical information. As used herein, identity representation information may include any data that represents the at least one identity. For example, this may include a unique identifier of the at least one identity, a name of the at least one identity, an image including a representation of the at least one identity (e.g., a profile picture, a series of photos, etc.), or other forms of information that may represent the at least one identity.

Group relationship information may include any information indicating relationships between the at least one identity and at least one other identity. In some embodiments, this may include identities or properties of a group the at least one identity is a member of. For example, this may include a unique identifier of a group associated with the at least one identity, as described above. In some embodiments, the group relationship information may not be associated with a defined or assigned group and may include any information indicating associations between the at least one identity and other entities.

Historical identity data may include any past or historical data associated with the at least one identity. In some embodiments, the identity historical information may include a historical access log including various actions performed by the at least one identity, as described above. In some embodiments, this may include various properties of the actions performed by the at least one identity. For example, this may include a date, a time, an activity type, an activity duration, an activity target, or the like. In some embodiments the identity historical information may include a creation date, a connection data, or various other dates associated with the identity.

Identity access information may include any information indicating properties of an identity in association with access to one or more resources. For example, this may include a permission assigned to the at least one identity. In some embodiments, security server 106 may store identity access information in an access profile associated with the at least one identity. Identity origin information may include any information indicating a source or origin from which the at least one identity accesses system 100. In some embodiments, this may include one or more network addresses associated with the at least one identity, as described above.

Accordingly, the data associated with the at least one identity may include at least one of: a unique identifier of the at least one identity, a name of the at least one identity, a unique identifier of a group associated with the at least one identity, a creation date, a historical access log, a permission assigned to the at least one identity, a network address associated with the at least one identity, properties of an activity performed by the at least one identity, or an image associated with the at least one identity. In some embodiments, the data associated with the at least one identity includes a combination of two or more categories of data, which may include any of the various categories of data listed above.

In some embodiments, step 810 may be performed in response to a request to change an authentication credential. In some embodiments, the at least one identity may be an identity associated with the change in credentials (e.g., the identity requesting the change, etc.). Alternatively or additionally, the at least one identity may include at least one identity that is different from the identity associated with the change in credentials.

In step 820, process 800 may include generating an intermediate value based on the data associated with the at least one identity. For example, this may include generating intermediate value 710, as described above. In some embodiments, process 800 may be performed without generating an intermediate value. For example, if the data associated with the identity is a in the exact length of the expected intermediate value, no intermediate value may be generated.

In step 830, process 800 may include generating, based on application of a secret logic algorithm to the intermediate value, a secret data element. For example, this may include generating secret data element 612 and/or 712 as described above. In some embodiments, generating the secret data element may include performing one or more hashing functions to the data associated with the at least one identity. For example, this may include concatenating two or more data elements of the data associated with the at least one identity or applying a summation function to the data associated with the at least one identity, as described herein.

In step 840, process 800 may include making available, the secret data element, to be embedded in an authentication credential associated with the at least one identity. For example, this may include making the secret data element available to be embedded in password 616 or 716, as described above. In some embodiments, the secret data element may be made available together with a randomized data portion, such as randomized data portions 614 or 714.

In step 850, process 800 may include identifying an attempt to change the authentication credential, the attempt including new authentication credential data to replace data in the authentication credential. For example, an identity associated with the authentication credential may attempt to change the authentication credential (e.g., by attempting to change a password, etc.).

The new authentication credential may be validated based on whether it includes the secret data element. For example, in step 860, process 800 may include validating, conditional on a determination whether the new authentication credential data includes the secret data element, the attempt to change the authentication credential. In some embodiments, this may be based on whether the new authentication credential data includes the secret data element in a predefined location, as described above.

In step 870, process 800 may include determining, based on the validating, whether to perform a control action based on the new authentication credential data. For example, the control action may be implemented as a security function when the new authentication credential data is not validated. In some embodiments, the control action may include generating an alert identifying the new authentication credential data as a candidate to include a security risk. As other nonlimiting examples, the control action may include one or more of: disabling network access for the at least one identity; monitoring activity of the at least one identity; rotating the authenticating credential data; modifying access permissions for the at least one identity; displaying a request for re-authentication to the at least one identity, or registering the new authentication credential data in a credential repository. In some embodiments, the control action may be performed on the access-controlled resource. For example, this may include isolating the access-controlled resource from the network, which may prevent future access to the access-controlled resource. In some embodiments, this may include suspending the access-controlled resource, which may "freeze" the access-controlled resource with the intent of restoring access at a later time or date. As another example, the control action may include performing forensic analysis on the access-controlled resource, which may include investigating files, memory, processes, network interfaces, or other components of the access-controlled resource. In some embodiments, the control action may include restoring previous states of the access-controlled resource, for example, from a backup repository, a snapshot repository, an installed agent, a bank of resource images, or the like.

While the secret data element disclosed herein is generally described as an element embedded in a credential for purposes of validation of a credential, in some embodiments, the secret data element may be implemented to embed information within the credential. For example, this may include embedding information related to the authorization of an entity, such as policy information, permissions, or other information for a particular user or group of users within the credential itself. Example policy information may include a permissions policy (e.g., a set of permissions assigned to a user or a group of users), a conditional access policy (e.g., whether multi-factor authentication is required, a range of allowed IP addresses, etc.), a credential policy (e.g., a maximum age for a password or a token, a maximum number of users, length of a key, etc.), or other policy information associated with an access management system. This policy and/or permission data may be coded into the secret data element and embedded in the credential, similar to secret data elements 312, 612, and 712 as described above. Accordingly, an access policy may be represented as a short string of characters embedded in a credential (e.g., a password, key, etc.). For example, the secret data element representing the policy and/or permission data may be a string of ASCII (American Standard Code for Information Interchange) characters to represent the encoded data.

This policy and/or permission data may be coded into a secret data element, in various ways. In some embodiments, the policy and/or permission data may be stored as code, for example a JSON (JavaScript Object Notation) structure or other format. The data may then be encoded to a binary representation or other encoding based on a predetermined scheme. A secret algorithm may then be applied to the encoded representation to generate the secret data element. In this embodiment, the secret algorithm may be reversable such that the encoded representation of the policy and/or permission data may be extracted using the secret data element.

By embedding information related to the authorization of an entity, such as policy and/or permission data within the credential, this data may be made accessible in a secret and secure manner. For example, a secret data element having just a few characters may not be noticeable within a password and may appear to an outside observer as a typical credential. Further, even if the secret data element were identified, the policy and permission data would be inaccessible without access to the secret algorithm used to generate the secret data element or the encoding scheme used to represent the data. Accordingly, with access to the secret algorithm and a location of the secret data element (e.g., at a predefined position, etc.), policy information can be extracted from a credential itself without requiring access to other forms of policy or permission data. While policy and permission data are provided by way of example, it is to be understood that various other forms of data may be embedded within a credential in a similar fashion.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials will be developed and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for controlling changes to authentication credentials, the operations comprising:
   securely accessing data associated with at least one identity capable of accessing one or more access-controlled network resources, wherein the data associated with the at least one identity includes information enabling identification of the at least one identity;
   generating an intermediate value based on the data associated with the at least one identity, wherein the intermediate value the information enabling identification of the at least one identity; generating, based on application of a secret logic algorithm to the intermediate value, a secret data element;
   making, the secret data element, together with a randomized data portion, available to be embedded in an authentication credential associated with the at least one identity;
   identifying an attempt to change the authentication credential by the at least one identity, the attempt including new authentication credential data to replace data in the authentication credential;
   validating, conditional on a determination whether the new authentication credential data includes the secret data element in a predefined location, the attempt to change the authentication credential, wherein the secret data element in the predefined location is generated by the at least one identity using the secret logic algorithm and the data associated with the at least one identity; and
   determining, based on the validating, whether to perform a control action based on the new authentication credential data.

2. The non-transitory computer readable medium of claim 1, wherein the data associated with the at least one identity includes at least one of: identity representation information, group relationship information, historical identity data, identity access information, or identity origin information.

3. The non-transitory computer readable medium of claim 2, wherein the group relationship information includes at least one unique identifier for a group associated with the at least one identity.

4. The non-transitory computer readable medium of claim 2, wherein the representation of the at least one identity includes an image.

5. The non-transitory computer readable medium of claim 1, wherein the data associated with the at least one identity includes at least one of: a unique identifier of the at least one identity, a name of the at least one identity, a unique identifier of a group associated with the at least one identity, a creation date, a historical access log, a permission assigned to the at least one identity, a network address associated with the at least one identity, properties of an activity performed by the at least one identity, or an image associated with the at least one identity.

6. The non-transitory computer readable medium of claim 1, wherein the data associated with the at least one identity includes a combination of two or more categories of data.

7. The non-transitory computer readable medium of claim 1, wherein generating the secret data element includes performing one or more hashing functions to the data associated with the at least one identity.

8. The non-transitory computer readable medium of claim 7, wherein performing the one or more hashing functions includes concatenating two or more data elements of the data associated with the at least one identity.

9. The non-transitory computer readable medium of claim 7, wherein performing the one or more hashing functions includes applying a summation function to the data associated with the at least one identity.

10. The non-transitory computer readable medium of claim 1, wherein the control action includes rejecting the new authentication credential data.

11. The non-transitory computer readable medium of claim 1, wherein the control action includes generating an alert identifying the new authentication credential data as a candidate to include a security risk.

12. A computer-implemented method, executed by one or more hardware processors, for controlling changes to authentication credentials, the method comprising:

securely accessing data associated with at least one identity capable of accessing one or more access-controlled network resources, wherein the data associated with the at least one identity includes information enabling identification of the at least one identity;

generating an intermediate value based on the data associated with the at least one identity, wherein the intermediate value includes the information enabling identification of the at least one identity;

generating, based on application of a secret logic algorithm to the intermediate value, a secret data element;

making, the secret data element, together with a randomized data portion, available to be embedded in an authentication credential associated with the at least one identity;

identifying an attempt to change the authentication credential by the at least one identity, the attempt including new authentication credential data to replace data in the authentication credential;

validating, conditional on a determination whether the new authentication credential data includes the secret data element in a predefined location, the attempt to change the authentication credential, wherein the secret data element in the predefined location is generated by the at least one identity using the secret logic algorithm and the data associated with the at least one identity; and determining, based on the validating, whether to perform a control action based on the new authentication credential data.

13. The computer-implemented method of claim 12, wherein the method is performed by an agent on the one or more access-controlled network resources.

14. The computer-implemented method of claim 12, wherein the method is performed by a credential validation resource associated with a secure credentials repository that securely maintains the data associated with the at least one identity.

15. The computer-implemented method of claim 12, wherein the method is performed by a system configured to intercept a network traffic directed to the one or more access-controlled network resources.

16. The computer-implemented method of claim 12, wherein the method is performed by a system that securely maintains the data associated with the at least one identity.

17. The computer-implemented method of claim 12, wherein the method is performed by a system remote from a secure credentials repository that securely maintains the data associated with the at least one identity.

18. The computer-implemented method of claim 12, wherein the control action includes one or more of: disabling network access for the at least one identity; monitoring activity of the at least one identity; rotating the new authenticating credential data; modifying one or more access permissions for the at least one identity; displaying a request for re-authentication to the at least one identity; or registering the new authentication credential data in a credential repository.

19. The computer-implemented method of claim 12, wherein the control action is performed on the one or more access-controlled resources, including at least one of: isolating the one or more access-controlled resources from the network, suspending the one or more access-controlled resources, performing forensic analysis, and restoring previous states of the one or more access-controlled resources.

* * * * *